(12) United States Patent
Abrams et al.

(10) Patent No.: US 11,383,414 B2
(45) Date of Patent: Jul. 12, 2022

(54) PARTS DEGATING APPARATUS USING LASER

(71) Applicant: Syntec Optics, Rochester, NY (US)

(72) Inventors: David Abrams, Fairport, NY (US);
David Giancola, Fairport, NY (US);
Joel Lawther, Pittsford, NY (US);
Douglas H. Axtell, Canaseraga, NY (US)

(73) Assignee: Syntec Optics, Rochester, NY (US)

( * ) Notice: Subject to any disclaimer, the term of this patent is extended or adjusted under 35 U.S.C. 154(b) by 409 days.

(21) Appl. No.: 16/451,061

(22) Filed: Jun. 25, 2019

(65) Prior Publication Data

US 2020/0406519 A1    Dec. 31, 2020

(51) Int. Cl.
| | |
|---|---|
| *B29C 45/27* | (2006.01) |
| *B29C 45/38* | (2006.01) |
| *B23K 26/02* | (2014.01) |
| *B23K 26/08* | (2014.01) |
| *B23K 26/361* | (2014.01) |
| *B23K 26/03* | (2006.01) |
| *B23K 37/04* | (2006.01) |

(Continued)

(52) U.S. Cl.
CPC .......... *B29C 45/2708* (2013.01); *B23K 26/02* (2013.01); *B23K 26/032* (2013.01); *B23K 26/08* (2013.01); *B23K 26/083* (2013.01); *B23K 26/36* (2013.01); *B23K 26/361* (2015.10); *B23K 37/0426* (2013.01); *B29C 45/38* (2013.01); *B23K 2103/42* (2018.08); *B29C 2045/388* (2013.01)

(58) Field of Classification Search
CPC .... B23K 26/402; B23K 26/361; B23K 26/02; B23K 26/032; B23K 26/08; B23K 26/083; B23K 26/36; B23K 37/0426; B23K 2103/42; B29C 45/2708; B29C 45/38; B29C 2045/388
See application file for complete search history.

(56) References Cited

U.S. PATENT DOCUMENTS 3,947,210 A   3/1976  Levites
3,986,417 A * 10/1976 Anderson, Jr. .......... B26D 1/04
                                                          83/913
(Continued)

FOREIGN PATENT DOCUMENTS

| JP | 2003039483 A | * | 2/2003 |
|---|---|---|---|
| JP | 2006320956 A |  | 11/2006 |

(Continued)

*Primary Examiner* — Joel M Attey
*Assistant Examiner* — Franklin Jefferson Wang
(74) *Attorney, Agent, or Firm* — Louis S. Horvath

(57) ABSTRACT

A parts fabrication apparatus has a staging fixture that is configured to position at least a portion of a molded plastic assembly that has a connective runner portion with at least one molded part extended from the connective runner portion by a severable gate portion. A laser source is energizable to direct toward the severable gate portion, from a laser output aperture positioned beneath the staged plastic assembly, a coherent light beam having sufficient energy for melting the gate portion and releasing the molded part along a drop path. A support is disposed to deflect the drop path of at least a portion of the released molded part in a direction away from the coherent light beam.

16 Claims, 10 Drawing Sheets

(51) Int. Cl.
*B23K 26/36* (2014.01)
*B23K 103/00* (2006.01)

(56) References Cited

U.S. PATENT DOCUMENTS

| | | | | |
|---|---|---|---|---|
| 4,207,787 | A | * 6/1980 | Lewallyn | B26D 11/00 |
| | | | | 83/210 |
| 4,952,354 | A | 8/1990 | Kokoi et al. | |
| 5,435,956 | A | 7/1995 | McCrory | |
| 6,512,196 | B1 | * 1/2003 | Yoon | B23K 26/16 |
| | | | | 219/121.82 |
| 2002/0110612 | A1 | * 8/2002 | Schad | B23K 26/067 |
| | | | | 425/289 |
| 2004/0070117 | A1 | 4/2004 | Wilsterman et al. | |
| 2004/0185139 | A1 | 9/2004 | Adams et al. | |
| 2009/0072421 | A1 | * 3/2009 | Tung | B23K 26/38 |
| | | | | 264/2.7 |
| 2009/0236322 | A1 | * 9/2009 | Tung | B23K 26/0823 |
| | | | | 219/121.67 |
| 2015/0352671 | A1 | * 12/2015 | Darzi | B23K 26/38 |
| | | | | 219/121.71 |
| 2017/0312964 | A1 | * 11/2017 | Demange | B29C 45/0025 |
| 2021/0187659 | A1 | * 6/2021 | Yamaguchi | H01L 29/786 |

FOREIGN PATENT DOCUMENTS

| | | | |
|---|---|---|---|
| JP | 2007098910 A | 4/2007 | |
| JP | 2009061620 A | 3/2009 | |

* cited by examiner

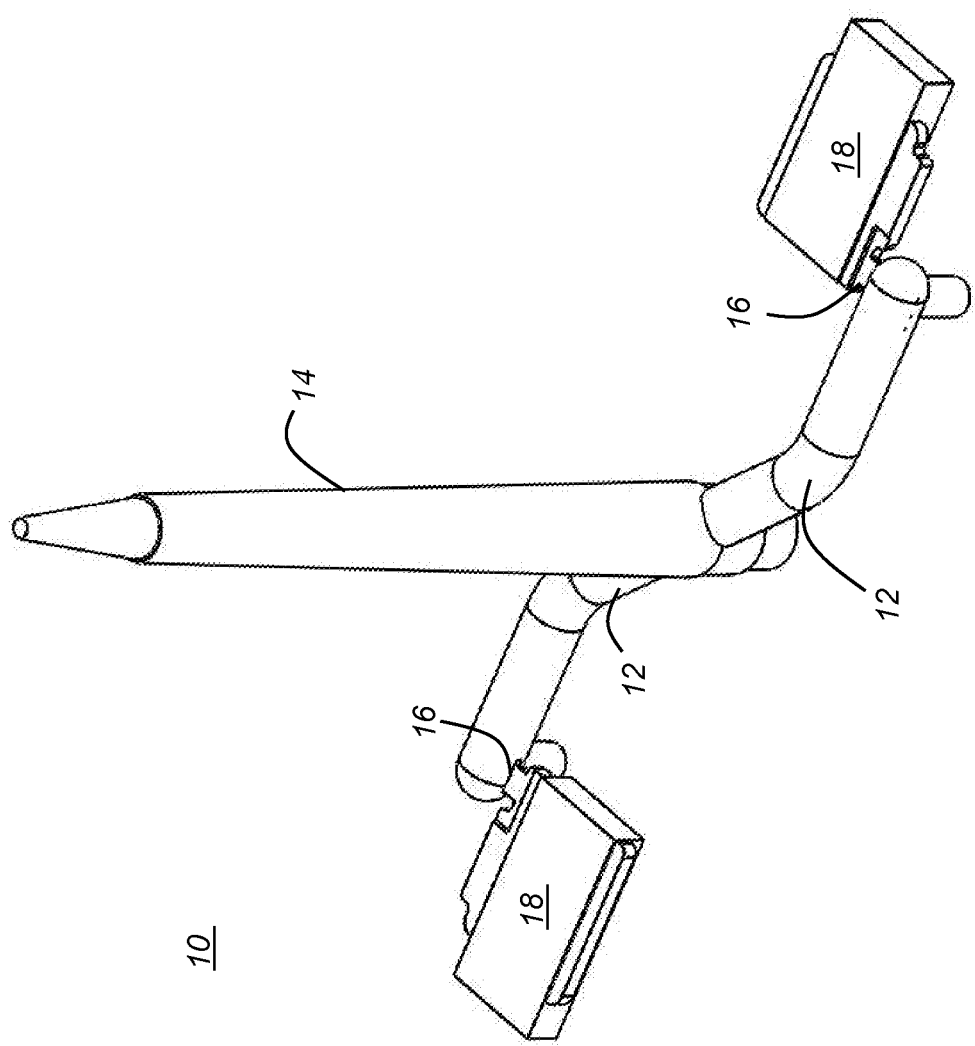

PARTS DEGATING APPARATUS USING LASER

FIELD OF THE INVENTION

This disclosure generally relates to parts fabrication for polymer materials and more particularly relates to apparatus and methods for degating of molded elements using heat energy from laser light.

BACKGROUND

Injection molding is a familiar process for plastic parts fabrication, particularly well suited to high volume production, able to provide significant cost savings over other fabrication methods for small-parts manufacture. The mold is formed to produce multiple small parts at a time, with the parts initially joined together in one molded assembly, with each part connected along a branch or "runner" of the assembly by a temporary gate portion. Degating separates each part, severed at its respective gate portion, from the molded assembly.

A number of degating techniques have been used for achieving parts separation. In general, degating can be successfully accomplished using cutting or shearing tools, possibly augmented using vibration, or using heat energy that is applied only locally along the gate portion, such as using a heated wire or focused laser beam.

For fabrication of optical elements such as lenses and other components, conventional degating methods have their shortcomings. Cutting methods, for example, apply a localized shear force to the part, potentially introducing stress and related birefringence or surface distortion that impact light handling by the molded part. Cutting can also generate unwanted particulate that must be removed properly to prevent damage to the part. Heat must be highly localized and must provide a clean, precise cut without leaving residual material on the part.

Degating methods using laser energy have been used to a limited degree, particularly for optical components and high-precision parts. However, disclosed methods for laser degating show appreciable room for improvement, particularly for high-volume, high-precision applications. Because of the need to properly align the molded assembly with the degating laser, it can be challenging to integrate laser degating apparatus with precision robotics systems that provide parts handling for the parts assembly once it is removed from the mold.

There are also demands for improved parts quality. For some high-precision optics, such as those used in medical applications, there can be a need for degating cutting accuracy to within +/−1 micron (1.0E-6 mm), with no residual material remaining on the molded part. Such high levels of accuracy and precision from automated parts handling systems can potentially result in increased cost and high parts rejection rates. Robust positioning apparatus capable of repeatable, accurate movement and alignment of the laser beam with the molded parts assembly can be difficult and costly to build or to reconfigure for different molded parts and can require frequent calibration and maintenance.

Thus, it can be appreciated that there would be value in methods and apparatus that provide accurate laser degating that is adaptable to either manual or automated parts handling, with reduced calibration and maintenance concerns.

SUMMARY

It is an object of the present disclosure to advance the art of precision fabrication for polymer parts, such as optical components. It is a feature of the present disclosure that it provides methods and apparatus for laser degating that can obviate the need for high-cost positioning equipment and can reduce the requirements for detailed periodic calibration.

According to an aspect of the present disclosure, there is provided a parts fabrication apparatus comprising:
a) a staging fixture that is configured to position at least a portion of a molded plastic assembly, wherein the molded plastic assembly has a connective runner portion with at least one molded part extended from the connective runner portion by a severable gate portion;
b) a laser source energizable to direct, toward the severable gate portion from a laser output aperture that is positioned beneath the staged plastic assembly, a coherent light beam having sufficient energy for melting the gate portion and releasing the molded part to fall along a drop path;
and
c) a support that is disposed to deflect the drop path of at least a portion of the released molded part, wherein deflection is in a direction away from the coherent light beam.

These and other aspects, objects, features and advantages of the present disclosure will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the disclosure will be apparent from the following more particular description of the embodiments of the disclosure, as illustrated in the accompanying drawings.

The elements of the drawings are not necessarily to scale relative to each other. Some exaggeration may be necessary in order to emphasize basic structural relationships or principles of operation. Some conventional components that would be needed for implementation of the described embodiments, such as support components used for providing power, for control and safety systems, and for mounting and translating a workpiece, for example, may not be shown in the drawings in order to simplify description.

FIG. 1A is a perspective view that shows an exemplary molded plastic assembly used in description in the present disclosure.

DETAILED DESCRIPTION

Figure 1B:
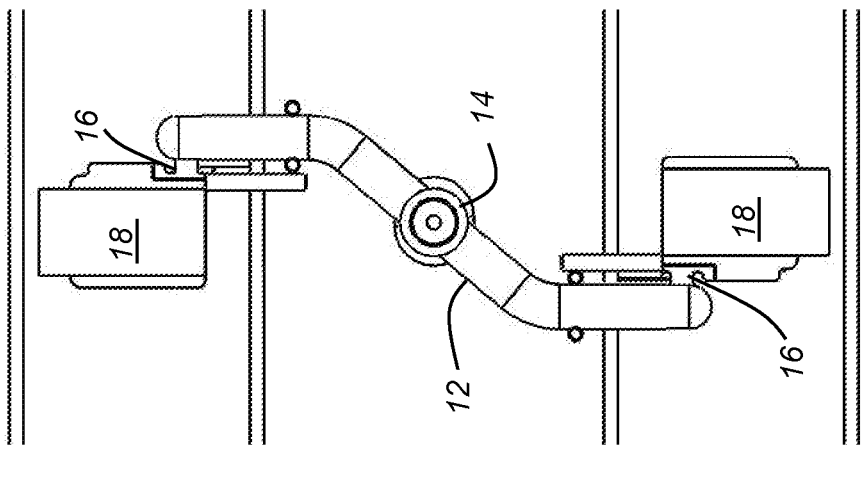
FIG. 1B is a top view showing the molded plastic assembly of FIG. 1A.

The following is a detailed description of the preferred embodiments, reference being made to the drawings in which the same reference numerals identify the same elements of structure in each of the several figures.

Where they are used in the context of the present disclosure, the terms "first", "second", and so on, do not necessarily denote any ordinal, sequential, or priority relation, but are simply used to more clearly distinguish one step, element, or set of elements from another, unless specified otherwise.

As used herein, the term "energizable" relates to a device or set of components that perform an indicated function upon receiving power and, optionally, upon receiving an enabling signal.

In the context of the present disclosure, the terms "plastic", "thermoplastic", and "polymer" can be used interchangeably to denote the material that is used for forming a molded part.

In injection molding of thermoplastic molded parts, molten thermoplastic material is injected into a mold that provides channels that form "runners" that can connect multiple molded parts together in a single molded plastic assembly. In the molded plastic assembly that emerges from the mold, each individual molded part connects to the runner by a temporary "gate", generally formed as a thin, narrow section of the plastic material. Removal of the gate can be effected by cutting, melting, bending, vibration, or by other action that applies localized energy onto the gate to melt, dissolve, or cut the gate and release the molded part. In the context of the present disclosure, the term "runner" is used as a general term that describes a connective portion of the molded assembly that is not a portion of the final molded part but that has a severable connection with the molded part via a gate. Parts handling for the full molded plastic assembly is often facilitated by providing a "sprue", typically molded from a feed opening in the mold and retained as a portion of the molded plastic assembly; the sprue provides a convenient shaft that can be used for parts placement, such as when using a robotic system.

By way of example and used for this illustrative purpose in the drawings of the present application, the perspective view of FIG. 1A and top view of FIG. 1B show a molded plastic assembly 10 that can be formed using injection molding. In this example, molded plastic assembly 10, prior to gate severance, is a unitary assembly, molded in one cycle of the injection molding system. Assembly 10 has a runner 12, a sprue 14, and two releasable molded parts 18 connected to runner 12 at temporary, severable gates 16. The goal of degating is release of the molded parts 18, without the released part retaining any unnecessary excess material from gates 16.

As noted previously in the background section, there can be a need for degating applications requiring high levels of accuracy and precision, with tight tolerances, such as may be required for some types of plastic optical elements. In such cases, the use of focused laser light can be advantaged over other degating methods. One problem not addressed by existing and proposed laser degating solutions relates to facilitating parts handling in order to perform the degating operation. In particular, robotics handling imposes some constraints on the degating phase of parts preparation. Parts interference problems during movement, such as can occur while translating the unfinished part into a position for gate removal and simultaneously guiding the laser into place for the gate-melting process, must be resolved.

Accurately and repeatably positioning the laser and molded plastic assembly, such as molded plastic assembly 10 of FIG. 1A, for precise degating to within tight tolerances can require the use of complex and costly positioning mechanisms. The laser beam and gate 16 must be maintained in precise registration while the gate 16 is melted; otherwise, distortion of the part or residual material from incomplete gate removal can cause unwanted featuring and defects in the finished released part.

An embodiment of the present disclosure addresses the need for precise registration of the laser beam to the part during degating by providing a parts fabrication apparatus that performs laser degating without movement of the laser between parts. Embodiments of the present disclosure maintain the laser position as a fixed reference, then fixture and position the molded plastic assembly 10 in register with this reference.

Figure 2A:
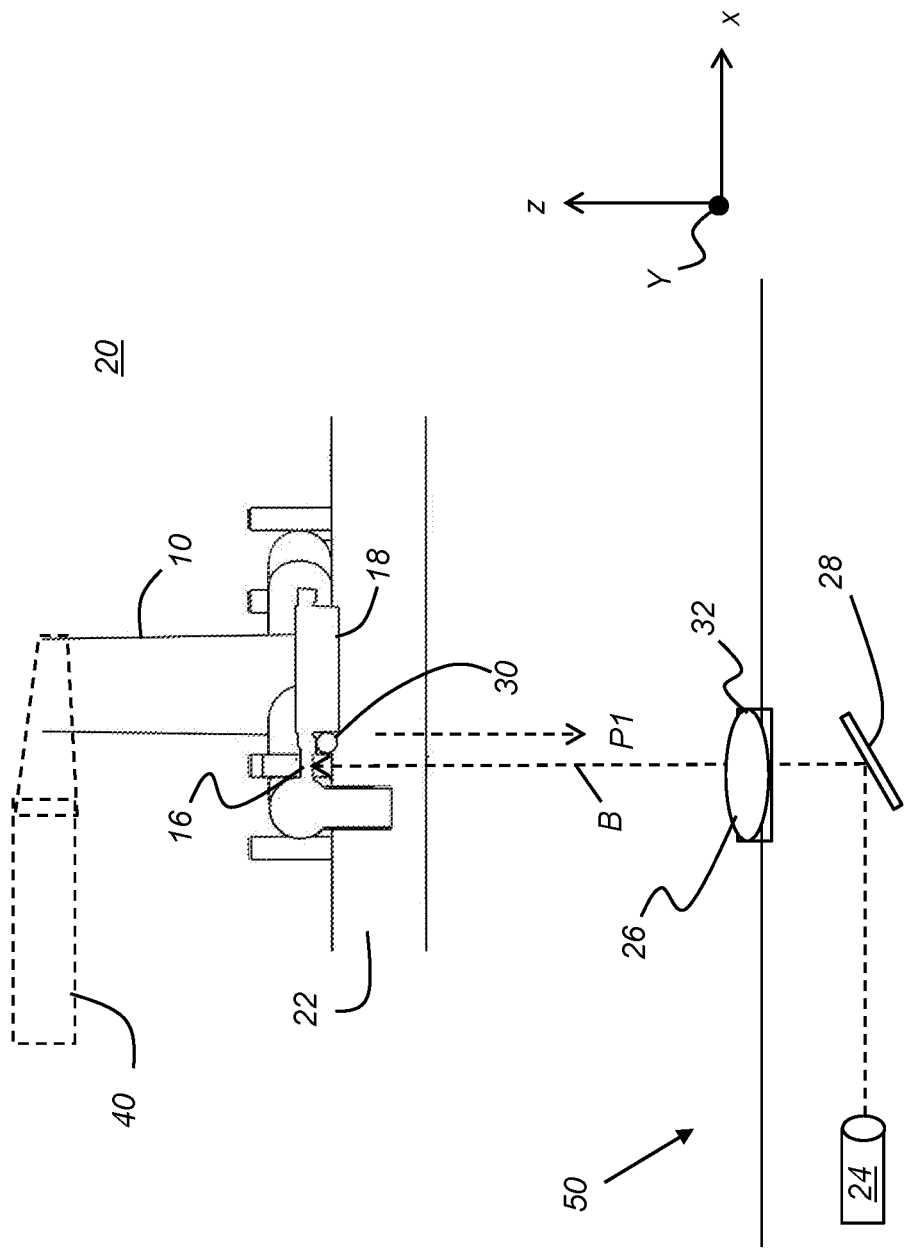
FIG. 2A is a side view schematic showing parts and subsystems of a parts fabrication apparatus according to an embodiment.
Figure 2B:
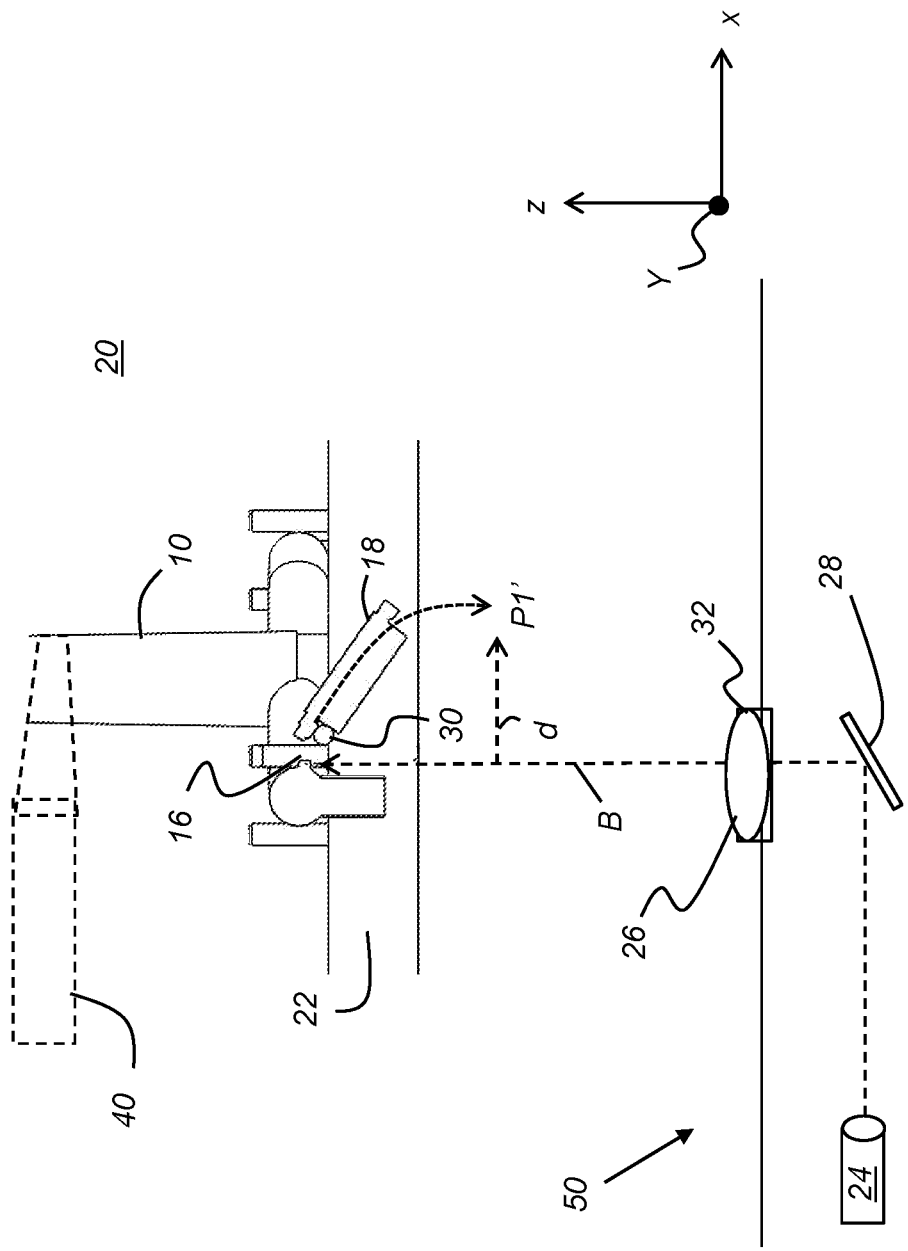
FIG. 2B is a side-view schematic showing aspects of component function and parts behavior during the degating process.

Referring to FIGS. 2A and 2B, there is shown, in side view schematic form, components of a degating apparatus 20 for releasing part 18 from molded assembly 10 by melting gate 16 using laser energy. FIG. 2A shows gate 16 in place as part of assembly 10 when retrieved from the mold; FIG. 2B shows component function during and following removal of severable gate 16 by the laser beam.

In the FIGS. 2A and 2B configuration, degating apparatus 20 has a staging fixture 22 that is configured to seat, suspend, or otherwise dispose molded plastic assembly 10 in register during the degating process. Staging fixture 22 can have one or more staging support features that are configured to dispose molded plastic assembly 10 accurately, maintaining the assembly 10 in position for the degating step in fabrication. Staging support features for this purpose can include one or more cavities or recesses, supporting struts or pins, or other suitable supporting and registration structures. Staging fixture 22 can be stationary or can be movable, such as a clamp provided under control of a robotics system or other machine. Fixture 22 can be configured for placement of molded plastic assembly 10 in register with a laser beam B that is generated by an optical apparatus 50 that has a laser 24 and associated optics, such as one or more reflective surfaces 28 and lenses 26. Laser beam B is a coherent light from laser 24; lens 26 or an appropriate window or opening provides an output aperture 32 for laser beam B. Output aperture 32 is disposed beneath gate 16 during degating. With respect to distance from aperture 32, considered along the direction of laser beam B emission, a pivot support or deflection support 30 is disposed between aperture 32 and gate 16.

Figure 2C:
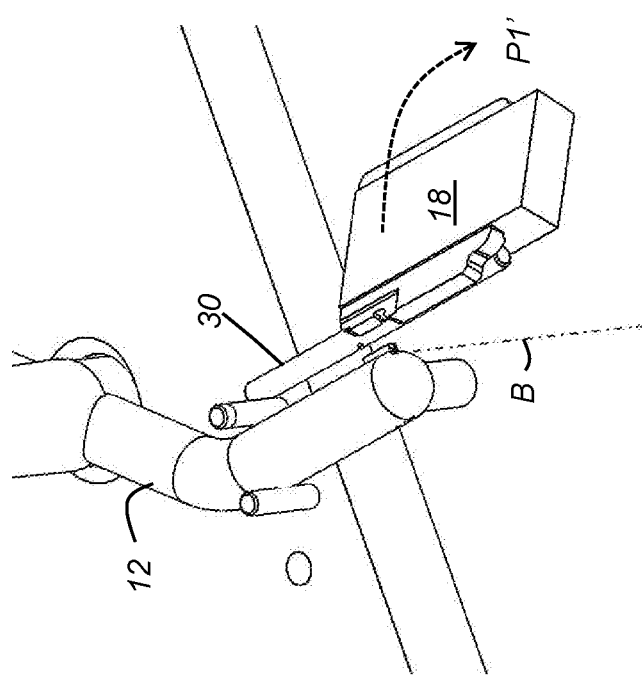
FIG. 2C is a perspective view that shows the degating process using features of the embodiment of FIGS. 2A and 2B.

As shown in the progression of FIGS. 2A, 2B, 2C, deflection support 30, positioned against or near molded part 18, disposed on the same side of part 18 as laser output aperture 32, deflects a drop path P1 of molded part 18 upon its release from gate 16. Fall path or drop path P1 is deflected by degating apparatus 20 in a direction d that is substantially orthogonal to laser beam B (wherein "substantially orthogonal" means orthogonal to within +/−18 degrees), so that the released part pivots on support 30 and falls away from the path of laser beam B, falling away from output aperture 32 and its associated optics along a deflected drop path P1' as shown in FIG. 2B. Support 30 provides a pivot point or pivot surface for directing the fall of the released part 18 into deflected drop path P1'. Support 30 can thus define the drop path P1' for the released part 18. The pivot point or surface of support 30 can provide a seat for supporting the part 18 prior to release from the molded assembly and in contact with the molded part 18 while gate 16 is melting; optionally, support 30 can be spaced apart from part 18 while melting, but so positioned as to deflect the drop path or release path of the released part 18 as it begins to drop when released after gate 16 melts.

Representative coordinate axes are shown for reference in FIG. 2A. The z-axis corresponds to the vertical component of the laser beam B direction. (Laser beam B is directed from below gate 16, but may be offset from true vertical.) The x- and y-axes define a plane orthogonal to the z-axis. In operation, the drop path P1' is shifted, with respect to x-y plane coordinates, by support 30.

According to an embodiment of the present disclosure, support 30 is in contact with molded part 18 when molded plastic assembly 10 is positioned in staging fixture 22. As gate 16 is melting, the weight of the molded part 18 causes the part 18 to sag, typically bending or pivoting away from assembly 10 according to the relative position of support 30. This position can be optimized for an individual part, such as to be suitably positioned so that the part's center of gravity, relative to the pivot position of support 30, assures that the molded part 18 will fall following release along a predictable, deflected drop path P1'. According to an embodiment of the present disclosure, the support is disposed so that less than 1/5 by weight of the molded part 18 lies between a point of contact with the support and the severable gate 16. Other favorable weight proportions could be used for positioning pivot support 30.

As noted previously, according to an alternate embodiment, support 30 can be spaced apart from contact with molded part 18 before the melting of gate 16 begins. Contact with part 18 may occur later in the melt cycle, such as when the part 18 sags or upon release of the part as it falls; support 30 then similarly obstructs and deflects the drop path P1' of the released part.

FIG. 2C is a perspective view that shows the degating process using features of the embodiment of FIGS. 2A and 2B.

Figure 3A:
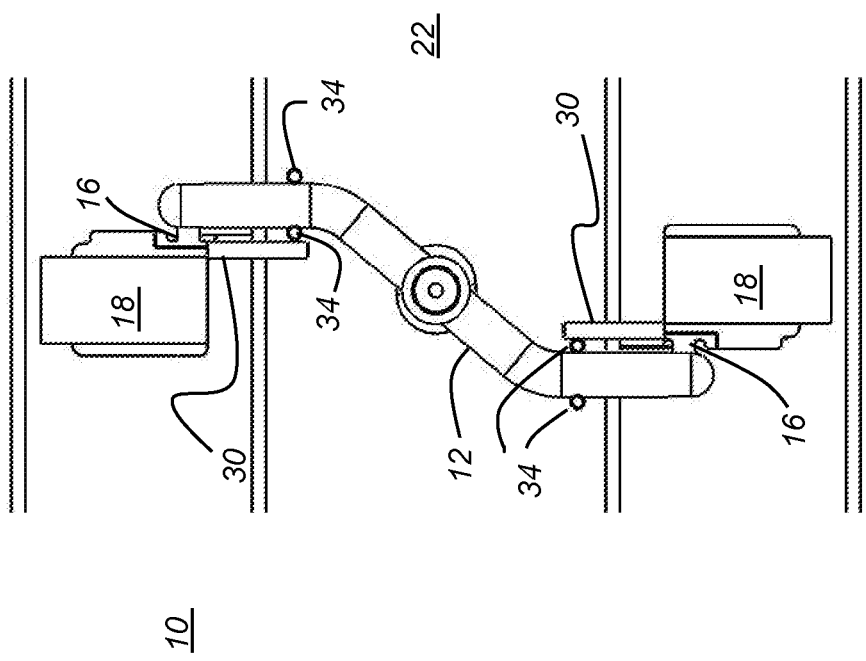
FIG. 3A is a top view showing features on a portion of a structure provided for degating according to an embodiment of the present disclosure.
Figure 3B:
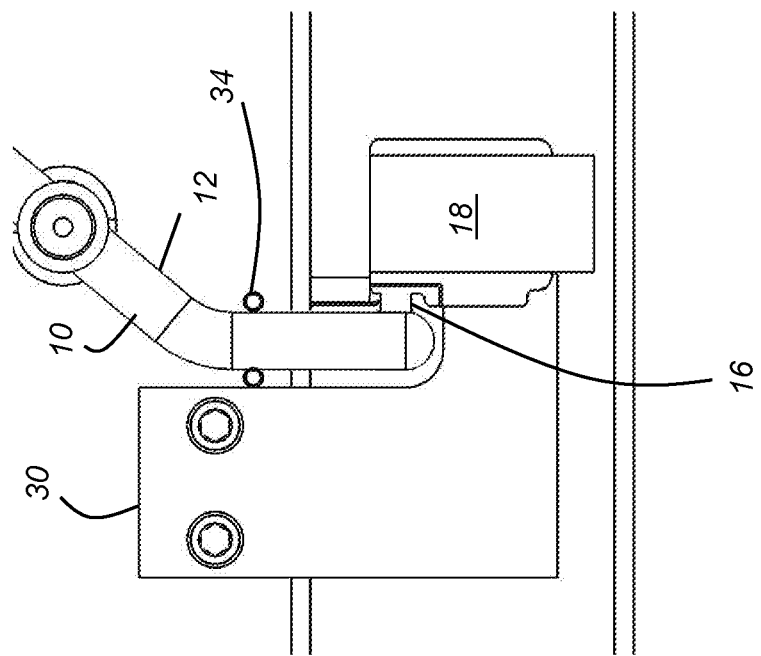
FIG. 3B is a top view showing features on a portion of a structure provided for degating according to an alternate embodiment of the present disclosure.

Support 30 can have any of a number of arrangements for providing a pivoting point, line, or surface that can seat against the molded part during gate severance and that defines the drop path of the released part 18. The top views of FIGS. 3A and 3B show two exemplary configurations of support 30. In FIG. 3A, support 30 can be, or can have the overall shape of, a wire, rod, or tube, which can be circularly cylindrical or have other suitable cross-sectional profile. Two supports 30 are shown in FIG. 3A, at symmetric positions relative to the shape of assembly 10. In FIG. 3B, support 30 has the form of a plate that provides an edge as a pivot seating or fulcrum for controlling the drop path of the released part. Support 30 can alternately be in the form of one or more point contacts that seat against the surface of part 18 prior to melting of gate 16.

FIGS. 3A and 3B also show registration pins 34 which can be provided as features for mechanical registration of molded plastic assembly 10 when seated or otherwise disposed in staging fixture 22. Registration of the assembly 10 to the coherent laser beam is provided, for example. Pins 34 extend from the surface of fixture 22. Other types of registration features known in the mechanical arts could alternately be used for this function, including grooved channels or seats for assembly 10 placement, for example.

Figure 4A:
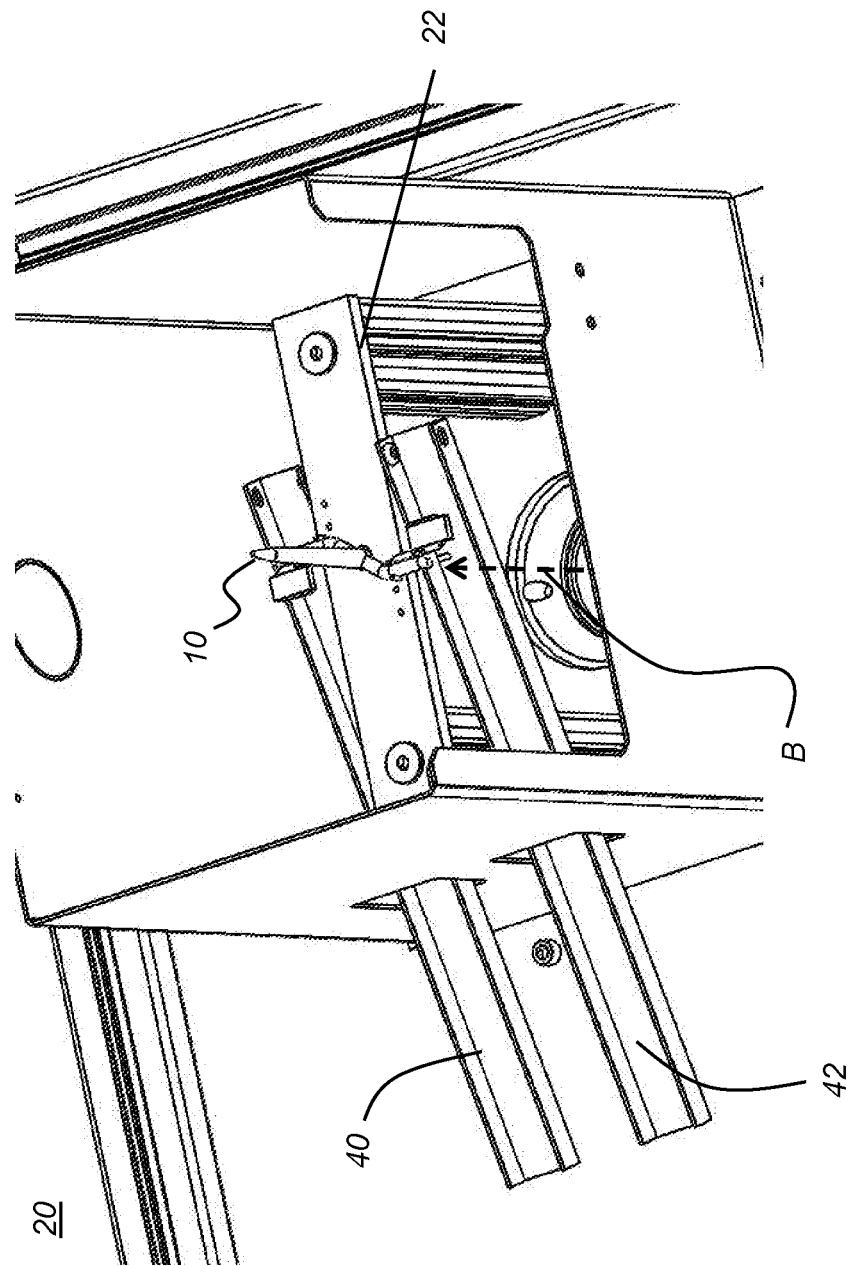
FIG. 4A is a perspective view of a portion of a degating apparatus that employs a set of trays for retrieval of released parts.
Figure 4B:
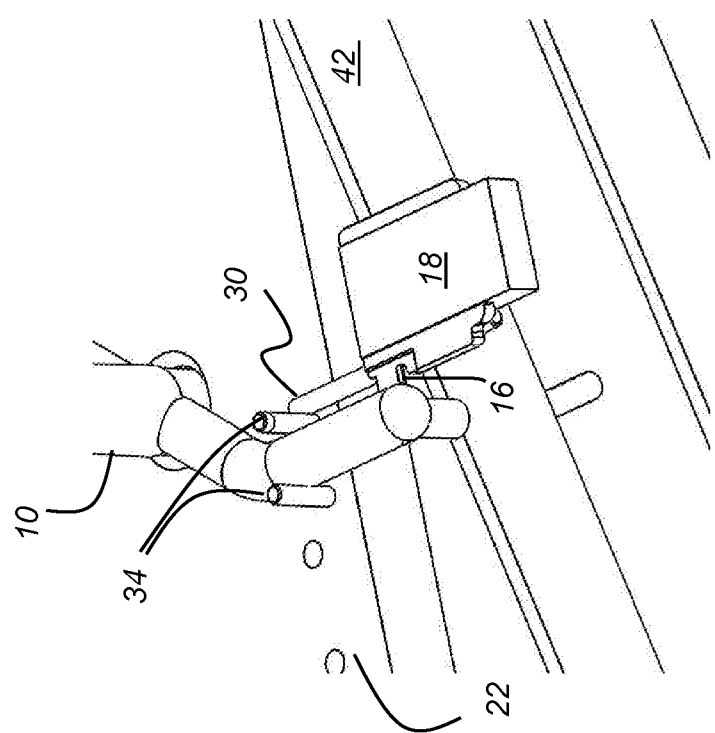
FIG. 4B is a top view of a portion of a fixture and tray within the degating apparatus of FIG. 4A.

By pivoting or cantilever action against support 30, the deflected drop path P1' follows a predefined course that clears the output aperture 32 and is out of the path of the coherent laser beam and away from associated laser optics of optical apparatus 50. FIGS. 4A and 4B show components of an improved degating apparatus 20 that has receiving trays 40, 42 for directing the released molded parts 18 into a collection bin (not shown) or other device or assembly for subsequent processing. The perspective view of FIG. 4A shows how staging fixture 22 is arranged for degating of assembly 10 for the example part of FIG. 1A, 1B. Laser beam B can be directed to each molded part 18 separately or can simultaneously heat each gate 16 to release the corresponding part 18. The top perspective view of FIG. 4B shows one edge of fixture 22 with part 18 still attached but suspended over receiving tray 42.

Figure 5:
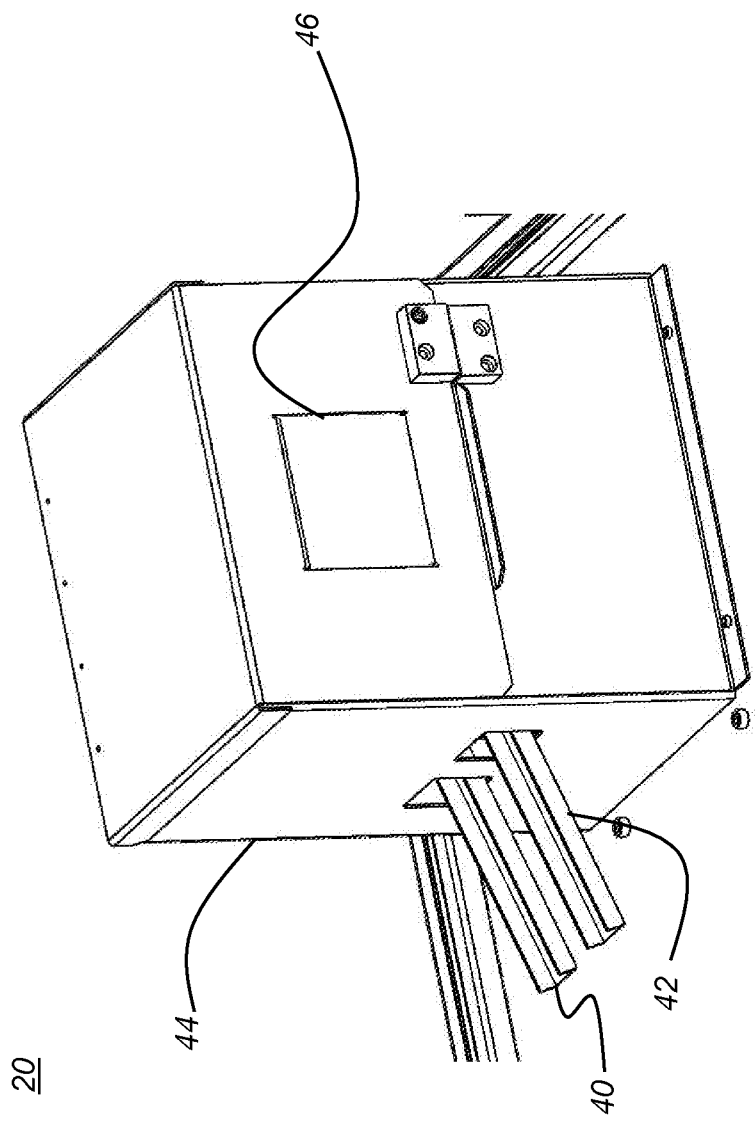
FIG. 5 is a perspective view of a chassis that contains a degating apparatus similar to that shown in FIGS. 4A and 4B.

FIG. 5 is a perspective view of degating apparatus 20 according to an embodiment of the present disclosure. Receiving trays 40, 42 extend outward from a chassis 44 that provides an optional window 46 for viewing the progress of the degating operation without exposure of the viewer to the focused laser light. Chassis 44 provides containment for enclosing the laser beam.

Although embodiments of the present disclosure have been described for molding optical elements, it should be noted that methods and apparatus of the present disclosure could be more generally applied to parts fabrication from injection molding and related molding equipment.

The invention has been described in detail, and may have been described with particular reference to a suitable or presently preferred embodiment, but it will be understood that variations and modifications can be effected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A parts fabrication apparatus comprising: a) a staging fixture that is configured to hold a severable gate portion of a molded plastic assembly at a melt position; b) a laser source energizable to direct, from a laser output aperture that is disposed beneath the melt position of the staged molded plastic assembly, a coherent melting light beam to the melt position and to release a molded part suspended from the staging fixture to fall away from the staging fixture on a drop path; and c) a stationary deflecting support supporting the severable gate portion disposed in a fixed location relative to the laser output aperture, between the laser output aperture and the melt position of the severable gate portion, and disposed to define the drop path of the falling released part by momentary contact following release of the molded part.

2. The apparatus of claim 1 wherein the support-is configured to have contact against the molded part during melting by the coherent light beam.

3. The apparatus of claim 1 wherein the support is disposed so that less than 1/5 of the molded part by weight lies between a point of contact with the support and the severable gate portion.

4. The apparatus of claim 2 wherein the support is disposed to pivot the molded part during melting by the coherent melting light beam.

5. The apparatus of claim 1 wherein the staging fixture is movable relative to the stationary deflecting support.

6. The apparatus of claim 1 wherein the support is a wire or rod having a circularly cylindrical cross-sectional profile.

7. The apparatus of claim 1 wherein the support provides an edge as a contact surface for the molded part.

8. The apparatus of claim 1 wherein the staging fixture further has one or more registration features for holding the molded plastic assembly.

9. The apparatus of claim 8 wherein the one or more registration features are pins extending from the fixture surface.

10. A parts fabrication apparatus comprising: a) a staging fixture that is configured to dispose a severable gate portion of a molded plastic assembly at a first position for separating a releasable molded part from the molded plastic assembly; b) a deflecting support that is configured as a pivot seating for contact against a portion of the releasable molded part positioned in the staging fixture; and c) an optical apparatus that has a source of laser light energizable to generate a coherent light beam, wherein the optical apparatus directs the generated coherent light beam from a fixed-position output aperture, fully past the support pivot seating, and toward the severable gate portion, wherein the coherent light beam has sufficient energy for releasing the molded part along a drop path defined by the deflecting support and wherein the support is stationary with respect to the output aperture.

11. The apparatus of claim 10 wherein the staging fixture has a fixed position relative to the stationary support.

12. The apparatus of claim 10 wherein the coherent light beam is directed from the output aperture in a beam direction that is opposite to a drop path direction for the released molded part.

13. The apparatus of claim 10 wherein the support comprises a wire or rod having a circularly cylindrical cross-sectional profile.

14. The apparatus of claim 10 wherein the support provides an edge as a pivot for controlling the drop path of the released part.

15. The apparatus of claim 10 wherein the staging fixture further has one or more registration features for holding the molded plastic assembly.

16. The apparatus of claim 15 wherein the one or more registration features are pins extending from the staging fixture.

* * * * *